(12) United States Patent
Gonzalez-Banos et al.

(10) Patent No.: US 7,664,571 B2
(45) Date of Patent: Feb. 16, 2010

(54) CONTROLLING A ROBOT USING POSE

(75) Inventors: Hector H. Gonzalez-Banos, Mountain View, CA (US); Victor Ng-Thow-Hing, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 655 days.

(21) Appl. No.: 11/406,483

(22) Filed: Apr. 17, 2006

(65) Prior Publication Data

US 2006/0271239 A1    Nov. 30, 2006

Related U.S. Application Data

(60) Provisional application No. 60/672,916, filed on Apr. 18, 2005.

(51) Int. Cl.
*G06F 19/00*    (2006.01)
(52) U.S. Cl. .............. 700/245; 345/156; 345/473; 702/153; 715/863
(58) Field of Classification Search ............. 700/245; 345/156, 473; 702/153; 715/863
See application file for complete search history.

(56) References Cited

U.S. PATENT DOCUMENTS

| | | | |
|---|---|---|---|
| 4,661,032 A | | 4/1987 | Arai |
| 5,790,124 A | * | 8/1998 | Fischer et al. ............ 345/629 |
| 5,876,325 A | | 3/1999 | Mizuno et al. |
| 6,088,042 A | * | 7/2000 | Handelman et al. ...... 345/473 |
| 6,148,280 A | * | 11/2000 | Kramer .................... 702/153 |
| 6,212,443 B1 | | 4/2001 | Nagata et al. |
| 6,256,033 B1 | | 7/2001 | Nguyen |
| 6,341,246 B1 | * | 1/2002 | Gerstenberger et al. ... 700/245 |
| 6,377,281 B1 | * | 4/2002 | Rosenbluth et al. ....... 715/700 |
| 6,496,756 B1 | | 12/2002 | Nishizawa et al. |
| 6,686,844 B2 | | 2/2004 | Watanabe et al. |
| 6,697,709 B2 | | 2/2004 | Kuroki et al. |
| 6,714,840 B2 | | 3/2004 | Sakaue et al. |
| 6,788,809 B1 | | 9/2004 | Grzeszczuk |
| 6,801,637 B2 | | 10/2004 | Voronka et al. |
| 6,804,396 B2 | | 10/2004 | Higaki et al. |
| 2004/0002642 A1 | | 1/2004 | Dekel et al. |
| 2004/0017313 A1 | * | 1/2004 | Menache .................. 342/465 |
| 2004/0036437 A1 | * | 2/2004 | Ito ......................... 318/568.12 |
| 2004/0161132 A1 | | 8/2004 | Cohen et al. |

OTHER PUBLICATIONS

PCT International Search Report and Written Opinion, PCT/US06/14634, Sep. 24, 2007, 7 pages.
Ambrose, R.O. et al., "Robonaut: NASA's Space Humanoid," Humanoid Robotics, IEEE, Jul./Aug. 2000, pp. 57-63.
Andriacchi, T.P. et al., "A Point Cluster Method for In Vivo Motion Analysis: Applied to a Study of Knee Kinematics," Journal of Biomechanical Engineering, Dec. 1998, pp. 743-749, vol. 120.
Arita, D. et al., "Real-Time Computer Vision on PC-Cluster and Its Application to Real-Time Motion Capture," IEEE, 2000, pp. 205-214.
Chaudhari, A.M., "A Video-Based, Markerless Motion Tracking System for Biomechanical Analysis in an Arbitrary Environment," Bioengineering Conference ASME, 2001, pp. 777-778, vol. 50.

(Continued)

*Primary Examiner*—Khoi Tran
*Assistant Examiner*—Stephen Holwerda
(74) *Attorney, Agent, or Firm*—Fenwick & West LLP; Mark E. Duell

(57) ABSTRACT

Systems and methods are presented that enable robot commands to be determined based on the pose of an object. A method is described for determining the orientation and pose of an object using indistinguishable points. The resolution of the pose detection is based on the robot' command vocabulary. A system is described for controlling a robot by pose detection using unlabelled points.

39 Claims, 2 Drawing Sheets

OTHER PUBLICATIONS

Chen, X. et al., "Wide Area Camera Calibration Using Virtual Calibration Objects," IEEE, 2000, 8 pages.

Elhajj, I. et al., "Real-Time Control of Internet Based Teleoperation with Force Reflection," Proceedings of the 2000 IEEE International Conference on Robotics & Automation, Apr. 2000, pp. 3284-3289.

Heikkila, J. et al., "A Four-Step Camera Calibration Procedure with Implicit Image Correction," IEEE, 1997, pp. 1106-1112.

Hu, T. et al., "Real-Time Haptic Feedback in Laparoscopic Tools for Use in Gastro-Intestinal Surgery," MICCAI 2002, LSCNS 2488, 2002, pp. 66-74.

"Humanoid Animation Working Group," [online] [Retrieved on Apr. 23, 2006] Retrieved from the Internet<URL:http://www.hanim.org/>.

Kanehiro, F. et al., "OpenHRP: Open Architectue Humanoid Robotics Platform," The International Journal of Robotics Research, Feb. 2004, pp. 155-165, vol. 23, No. 2.

Krotkov, E. et al., "Safeguarded Teleoperation for Lunar Rovers: From Human Factors to Field Trials," pp. 1-21, 1996.

Li, X. et al., "Hybrid Event Based Control Architecture for Tele-Robotic Systems Controlled Through Internet," Journal of Zhejiang University Science, 2004, pp. 296-302, vol. 5, No. 3.

Nasu, Y. et al., "Development of "Bonten-Maru" Humanoid Robot," Bull. Yamagata Univ. (Eng.), Feb. 2004, pp. 1-11, vol. 28, No. 1.

Niemeyer, G. et al., "THUMP: An Immersive Haptic Console for Surgical Simulation and Training," Medicine Meets Virtual Reality 12, 2004, IOS Press, pp. 272-274.

"Open PINO Platform," 2001-2001, Kitano Symbiotic Systems Project, [online] [Retrieved on Apr. 23, 2006] Retrieved from the Internet<URL:http://www.symbio.jst.go.jp/PINO/index.html>.

Pardo, F. et al., "Space Variant Vision and Pipelined Architecture for Time to Impact Computation," IEEE, 2000, pp. 122-126.

Pardo-Casellote, G., "OMG Data-Distribution Service: Architectural Overview," Proceedings of the 23$^{rd}$ International Conference on Distributed Computing Systems Workshops (ICDCSW '03), IEEE, 2003, 7 pages.

"Player/Stage," Jun. 15, 2006, SourceForge.net, [online] [Retrieved on Apr. 23, 2006] Retrieved from the Internet<URL:http://playerstage.sourceforge.net/player/player.html>.

Qian, G. et al., "A Gesture-Driven Multimodal Interactive Dance System," IEEE, 2004, 4 pages.

Rajko, S. et al., "Autonomous Real-Time Model Building for Optical Motion Capture," IEEE, 2005, 5 pages.

Sian, N.E. et al., "Whole Body Teleoperation of a Humanoid Robot—Development of a Simple Master Device using Joysticks," Proceedings of the 2002 IEEE/RSJ Intl. Conference on Intelligent Robots and Systems, Oct. 2002, pp. 2569-2574.

"Sony Global—QRIO," 2006, Sony Corporation, [online] [Retrieved on Apr. 23, 2006] Retrieved from the Internet<URL:http://www.sony.net/SonyInfo/QRIO/top_nf.html>.

Vaughan, R.T. et al., "On Device Abstractions for Portable, Reuseable Robot Code," Proceedings of the 2003 IEEE/RSJ Intl. Conference on Intelligent Robots and Systems, Oct. 2003, pp. 2421-2427.

Zhang, Z. et al., "A Flexible New Technique for Camera Calibration," IEEE Transactions on Pattern Analysis and Machine Intelligence, Nov. 2000, pp. 1330-1334, vol. 22, No. 11.

* cited by examiner

CONTROLLING A ROBOT USING POSE

CROSS-REFERENCE TO RELATED APPLICATION

This application claims priority from the following U.S. provisional patent application, which is hereby incorporated by reference: Ser. No. 60/672,916, filed on Apr. 18, 2005, entitled "A Simple Robot Puppeteering System: Controlling Androids Using Human Pose."

BACKGROUND OF THE INVENTION

1. Field of the Invention

The present invention relates to determining robot commands, specifically determining robot commands from the pose of an object.

2. Description of Background Art

Controlling robots presents a particular user-interface challenge. Sophisticated robots are capable of executing an extremely broad command set, requiring that the user interface for controlling these robots be receptive to input having a high number of degrees of freedom. On the other hand, robot applications frequently demand that control of the robot be quick, intuitive, and noninvasive.

Previous approaches to controlling robots have focused on manipulating a control device. For example, a user may select robot commands by using a joystick, typing on a keyboard, or moving a model of the robot configured for teleoperation. However, such methods are generally limited in the number of degrees of freedom of the commands they can be used to select, or in some cases are non-intuitive for users, requiring a high degree of training to operate.

Therefore, what is needed are systems and methods for determining robot commands that do not require the manipulation of a control device.

SUMMARY OF THE INVENTION

Systems and methods are presented that determine robot commands based on the pose of an object. Indistinguishable points representing locations on the object are separated into subsets.

The subsets of points are used to determine the pose of the object. For example, in one embodiment, a subset of points is used to determine the orientation of a sub-part of the object. The orientations of one or more sub-parts of the object may be used to collectively determine the pose of the object.

The number of subsets of points is based on the set of commands that can be represented by the pose of the object. For example, in one embodiment, the pose of an object can represent one of two commands. Also, each command can have one or more parameters.

The pose of the object is used to determine one or more robot commands from the set of commands that can be represented by the pose of the object.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
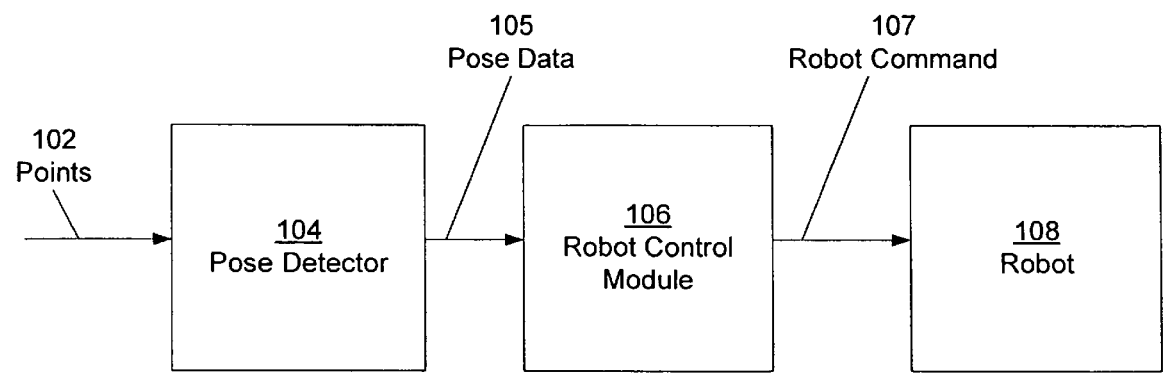
FIG. 1 illustrates a system for controlling a robot by pose detection, according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

1. Determining a Robot Command Based on the Pose of an Object

In one embodiment a system determines a robot command based on the pose of an object. The robot command determined by the system can be used to control a robot that is real or virtual, humanoid or otherwise. For example, the robot controlled by the command can be an avatar, a virtual character on a screen, or a physical robot operating perhaps thousands of miles away from the object whose pose has been determined. Other examples of robots which can be controlled by the robot commands will be apparent to one of skill in the art. Any of these robots can be used without departing from the scope of the present invention.

The command determined by the system is a member of a set of available robot commands. A robot command defines robot behavior at a specific level of granularity. The granularity of a robot command can vary depending on the application for which that command is intended. For example, in some cases it may be useful that the command be at the level of specific servo-by-servo instructions. Such commands are said to have low-level task descriptions. In other cases it may be useful that the command be at the level of predefined programs, such as an instruction to "perform morning chores." In one embodiment, the robot commands define robot behavior at a level of granularity consistent with basic tasks, such as "pick up newspaper" or "knock over cup." Such commands are said to have high-level task descriptions. The execution of a command having a high-level task description may result in the execution (in series or parallel) of a plurality of commands having low-level task descriptions.

The set of available robot commands will also depend on the degrees of freedom of the robot to be controlled by the command. For example, a primitive robot may have only two degrees of freedom, such as bearing and forward/reverse. As another example, humanoid robots have been implemented having as many as eighty (or more) degrees of freedom, allowing for commands for bearing, forward/reverse, head orientation, torso orientation, left elbow angle, right elbow angle, and so on. Typically, a humanoid robot with a high number of degrees of freedom will have more commands available to it than the primitive robot, despite differences in the granularity of the commands available to the two types of robot.

Together, the capabilities of the robot and the granularity of the robot commands will define a command vocabulary, a search space in which commands may be determined. The scope of the command vocabulary can depend not only on the capabilities of the robot, as in the example described above, but also on the application in which those commands are used. For example, two equally sophisticated robots (or even the same robot) may have different command vocabularies, each vocabulary appropriate to one particular use of the robot. In one application it may be desirable to control the robot using step-by-step, joint-specific commands, while in another application it is desirable to control the robot using broader, goal-specific commands. In one embodiment, a robot's command vocabulary is a subset of the set of commands that the robot is capable of performing (the "available" commands).

A system determines robot commands from the command vocabulary by determining the pose of an object. Determining the pose of an object is potentially a difficult and resource-consuming task. Since the system determines pose for the purpose of determining a robot command, the efficiency of the pose detection can be improved by limiting the resolution of the pose detection. For example, the resolution can be based on the degrees of freedom of the command vocabulary. In many cases, partially determining the pose of the object is sufficient for determining a robot command from a limited command vocabulary. The reduced requirements for the pose detection increase the real-time performance, noninvasiveness, and efficiency of the robot control system.

The system determines the pose of an object with a resolution that is based on the degrees of freedom of the command vocabulary. As will be apparent to one of skill in the art, the pose of the object can be determined using a variety of techniques. One method for determining the pose of an object is described below. Other methods for determining the pose of the object can be implemented without departing from the scope of the present invention.

2. Determining Pose of an Object Using Indistinguishable Points

One method for determining pose uses a collection of indistinguishable points. A point describes a three dimensional (3D) location on an object. A point can be detected from a marker using a variety of techniques, described below with reference to FIG. 1. A marker can be real or virtual, and can be connected to any object, humanoid or otherwise. A marker can be any natural or artificial visual feature of the object. According to one embodiment of the present invention, a markers is a visual feature that is part of the object itself. According to another embodiment of the present invention, a marker can be distinct from the object, and introduces a visual feature corresponding either to a location on the object or to a location that is a fixed distance from a location on the object. The markers can also be sparse or dense. In a preferred embodiment, at least three markers are connected to the object.

The points are indistinguishable in the sense that the known difference between any two points is limited to their locations. In contrast, a distinguishable point includes additional information indicating that the point is associated with a particular location on the object, or indicating where that particular point was at a previous moment in time. One advantage of using indistinguishable points is the ability to use unlabeled markers. Unlabeled markers are generally less invasive and easier to configure on an object than labeled markers. For example, uninstrumented markers may be used, such as markers that passively reflect light. As the method avoids the need to correlate a point's current location with its previous location in time, the method enables real-time operation and increased robustness, even when used in conjunction with reduced computational resources and/or noisy environments.

The method can be used to determine either the orientation or pose of an object. Orientation is a global value for an object. For the purposes of orientation detection, objects are assumed to be rigid. All rigid objects, real or virtual, have an orientation.

An articulated object can be defined as a collection of rigid objects connected by joints. All articulated objects have a pose. Pose is defined as the collection of orientations of the rigid objects making up the articulated object. Hence, pose is trivial for non-articulated objects; the pose of the object is the orientation of the single rigid object making up the non-articulated object.

A standard coffee cup is an example of a non-articulated object. The cup has an orientation, which can be any direction in 3D space. A stapler is an example of a simple articulated object. Like the cup, the stapler can be oriented in any direction in 3D space. However, unlike the cup, the stapler is composed of two rigid bodies having orientation—a base and a top. The pose of the stapler can be defined as the relationship between the orientation of the base and the orientation of the top.

The human body is an example of a more complicated articulated object. The human body has an orientation and an elaborate pose. The human body can be approximated as a collection of rigid objects. These rigid objects can correspond to parts of the human body. For example, the left upper arm of a body could be considered a first rigid object, the head a second rigid object, the upper torso a third rigid object, the lower torso a fourth rigid object, and so on. Similar to the example of the stapler, the pose of the human body can be defined as the relationship between the orientations of these rigid objects.

Generally, determining the complete pose of a complicated articulated object (such as the human body) in real-time requires a great amount of processing resources. However, for many applications such resolution is not necessary. For example, if the primary purpose of determining pose is to determine a robot command, then the level of detail of the pose determination can be decreased to be on par with the degrees of freedom of the robot command vocabulary. While the complete pose of the human body may describe the relationship between orientations of a great number of rigid bodies, a simplified pose may describe the relationship between orientations of fewer rigid bodies. For many robot control applications, determining a simplified pose can be adequate to determine a robot command.

For the purposes of illustration, a human body has been selected as an example of an object having orientation and pose. It will be apparent that the method is applicable to any object, real or virtual, having an orientation and/or a pose, and that the discussion of human bodies is not limiting. For example, a person could manipulate an articulated object, and the object's orientation and/or pose could be used to determine a robot command.

According to one embodiment of the present invention, the orientation of an object is determined based on the orientation of a collection of points affixed to that object. For example, an orientation-detection system receives a collection of points, each point describing a 3D location. The system then constructs a 3D reference frame (a reference frame consisting of three orthogonal axes) as a function of the collection of points. Because the points are affixed to the object, determining the orientation of the collection of points results in determining the orientation of the object.

According to one embodiment of the present invention, the system constructs a 3D reference frame by fitting an orientable geometry to the arrangement or distribution of data points. An orientable geometry can be a plane, a set of vectors, an eigenvector, or any other construct that is not invariant to rotational transformations. The fitting can be accomplished using optimization or another numerical computation technique.

Several assumptions can facilitate the determination of the orientation of the object. For example, it can be useful to assume a certain spatial relationship among the points, or between the points and the rigid body. For example, the assumption that the points are coplanar would be useful for selecting a planar objective function. It can also be useful to assume that only certain orientations are possible, or that only certain orientations require differentiation from certain other orientations. For example, the degrees of freedom of the robot command vocabulary can make the system indifferent to differences in orientation due to lateral displacement. Given this indifference, the orientation-detection system can limit the degrees of freedom of the pose detection. In the example of determining the pose of a human body, and depending on the command vocabulary, the orientation of certain body parts may be irrelevant for determining a command from the set.

A pose detection system should be calibrated such that a given orientation of a collection of points can be assumed to be correlated to a certain orientation of the object. For example, a human operator with markers affixed would calibrate the pose detection system by assuming a calibration pose. Calibration establishes a relationship between the orientation of the collection of points describing the markers and the orientation of the body part to which the markers are affixed. Once a relationship between the orientation of the collection of points and the orientation of an object is established, the orientation of the collection of points can be used to determine the orientation of the object.

3. Controlling a Robot by Pose Detection Using Indistinguishable Points

FIG. 1 illustrates a system for controlling a robot by pose detection. Points 102 describe a location in 3D space. Each point describes a location on an object. In one embodiment, the object is a human body, and its pose is determined based on the orientation of the various body parts. The pose is then used to determine a robot command, and the robot command is sent to the robot for execution.

According to one embodiment of the present invention, each point describes a location of a marker affixed to the object. Locations on an object can be detected, recovered, or sensed using a variety of methods. For example, the locations on the object can be sensed using an array of cameras connected to a photogrammetry device, optical sensors, or inertial detectors. These example of techniques for sensing locations on the object are given for the purposes of illustration only and are not limiting. Other techniques for sensing markers or other locations on an object can be implemented without departing from the scope of the present invention. The detection of locations on the object results in points 102.

Points 102 describing locations on a single rigid object can be used to determine the orientation of that rigid object. Points 102 affixed to at least some of the rigid sub-parts (also referred to as "regions") of an articulated object can be used to determine the orientation of those rigid sub-parts, as well as the pose of the articulated object.

Pose detector 104 receives the points 102 and determines orientation and/or pose of the object. The method of the pose detector 104, according to one embodiment of the present invention, is described herein with reference to FIG. 2. The pose detector 104 produces pose data 105.

The pose data 105 describes the orientation and/or pose of an object. In one embodiment, the pose data 105 is given in the form of orientations (e.g., of the sub-parts) and/or angles between orientations. For example, if the detected orientations are described as planes, the pose data 105 might describe two angles (for example, theta and phi) formed by the intersection of each orientation plane with some reference plane. The pose data 105 can also include angles formed between the various orientation planes, in one or more dimensions. According to one embodiment of the present invention, the pose data 105 describes a reduced pose that is less specific than the complete pose of the object.

The robot control module 106 receives the pose data 105. The robot control module 106 converts the pose data 105 into a robot command 107. The robot control module 106 can be implemented, for example, by an input translator, a robot motor command module, and a robot controller.

A robot command 107 includes a set of one or more instructions to be executed by the robot 108. The robot 108 receives the robot command 107 from the robot control module 106 and executes the robot command 107.

Figure 2:
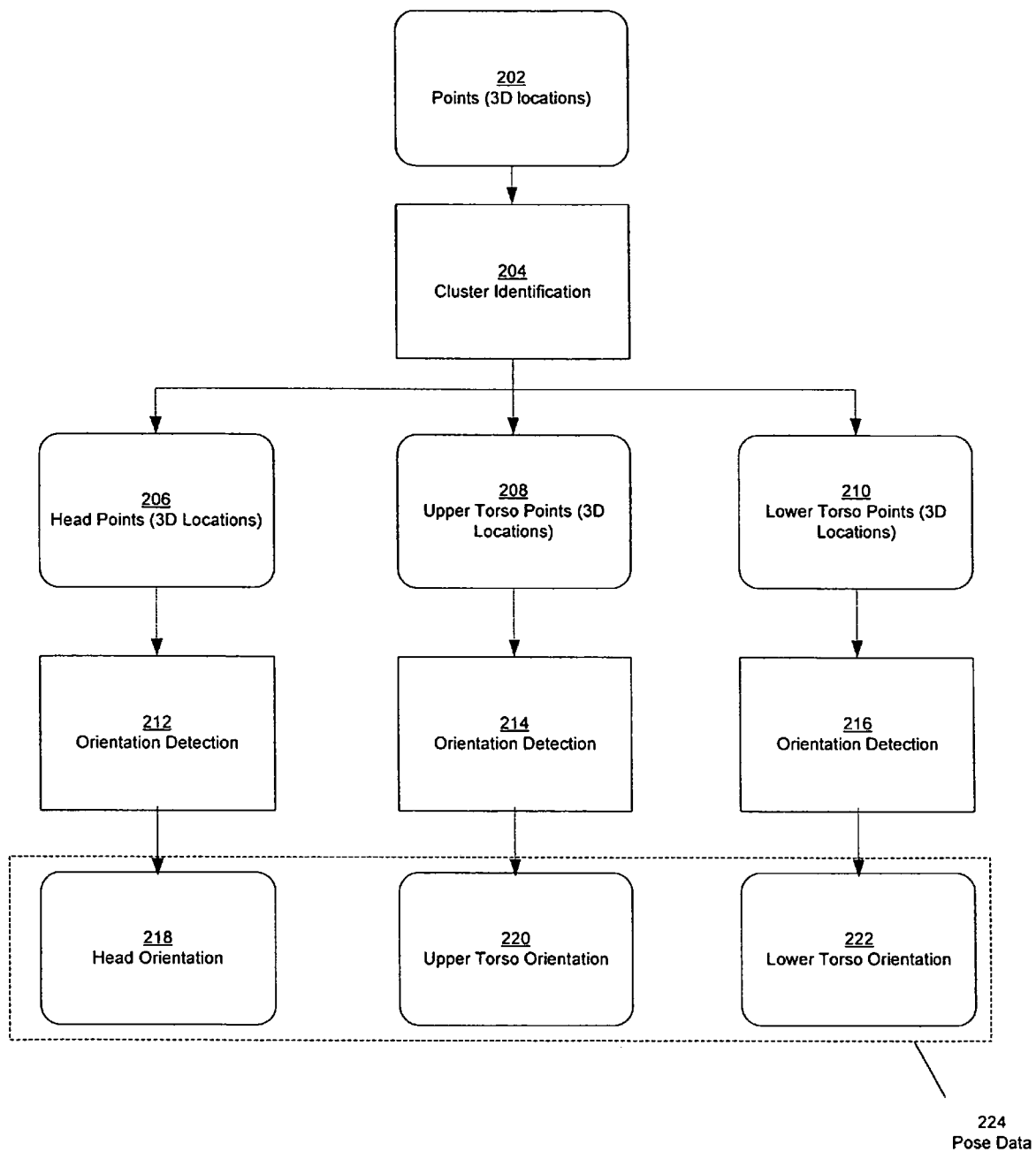
FIG. 2 illustrates the flow of data in a pose detection device, according to one embodiment of the present invention.

FIG. 2 illustrates the flow of data in a pose detection device, such as pose detector 104. The pose detection device receives points 202. According to one embodiment of the present invention, the points 202 are analogous to the points 102 described herein with reference to FIG. 1.

Cluster identification 204 separates the points 202 into subsets of points. The number of subsets into which the points are separated will affect the resolution of the pose determination. As such, in one embodiment, the number of subsets into which the points are separated is based on the size of the robot's command vocabulary.

According to one embodiment of the present invention, the cluster identification 204 determines which points describe locations on a first rigid object and which points describe locations on a second rigid object. For example, suppose that the set of commands in the robot's command vocabulary can be sufficiently specified by the orientations of the head, upper torso, and lower torso of a human body. The cluster identification 204 can separate the points 202 into head points 206, upper torso points 208, and lower points 210. Subsets of points such as these have been selected an example for the purpose of illustration, and the example is not limiting. Cluster identification 204 can separate the points 202 into subsets using a variety of methods and producing a variety of outcomes without departing from the scope of the present invention.

According to one embodiment of the present invention, the cluster identification 204 determines the two points 202 with the largest vertical separation and assumes that this separation is the delineation between the head and the upper torso. Any points 202 located above the higher of the two points are classified as head points 206. The cluster identification 204 takes the remaining points (which are located below the lower of the two points) and separates them along a median value in the vertical direction. Any points 202 located above this median value are classified as upper torso points 208, and any points 202 located below this median value are classified as lower torso points 210.

Other methods for separating the points 202 into various subsets can be implemented without departing from the scope of the present invention. For example, existing point cluster methods can be used to separate points into subsets when given a number of expected subsets. The number of subsets into which points should be separated can depend on the robot's command vocabulary, the degrees of freedom of the object itself, or both.

The orientation detection 212 uses the head points 206 to determine a head orientation 218. The orientation detection 212 determines orientation from points as described above. The orientation detection 212 can operate with particular assumptions for points associated with the head, such as, for example, a spherical or planar arrangement of the points affixed to the head.

The orientation detection 214 and orientation detection 216 operate similarly to the orientation detection 212, using the upper torso points 208 and lower torso points 210, respectively, and producing upper torso orientation 220 and lower torso orientation 222, respectively.

Any combination of one or more of head orientation 218, upper torso orientation 220, and lower torso orientation 222 defines a pose. The collection of the three orientations makes up the pose data 224, which can be analogous to the pose data 105 described herein with reference to FIG. 1. The system can additionally perform angle difference calculations to explicitly include joint angles in the pose data 224. The pose data 224 can be used to determine a robot command from a set of robot commands (e.g., from the robot's command vocabulary).

In the example illustrated, the properties of the object and the set of commands in the command vocabulary enable sufficient control of the robot while determining only a very basic pose. Since, in the example, the system determines only the orientation of three objects (head, upper torso, lower torso), the system would use a small amount of processing resources in comparison to a similar system detecting the full pose of the human body. The reduction in processing overhead can improve performance and increase the overall usability of the robot control system.

The example of a pose based on the orientation of three sub-parts (i.e. regions) of an object has been shown for the purposes of illustration. The same system (or a similar system), when determining a command from a different command vocabulary, could determine pose in greater or lesser detail (for example, by determining orientations of four, or five or dozens of sub-parts.) An increase in the detail of the pose determination would be useful, for example, when generating a robot command for a robot having different capabilities, or when the robot is being used for an application benefiting from a different command granularity. Other benefits and applications of the system will be apparent to one of skill in the art without departing from the scope of the present invention.

The language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for determining one or more robot commands for controlling a robot the method comprising the steps of:

receiving a set of indistinguishable points representing locations on an object having a pose, association of each indistinguishable point to the location on the object not predefined;

separating the set of indistinguishable points into a plurality of subsets of indistinguishable points including a first subset of indistinguishable points representing locations on a first region of the object and a second subset of indistinguishable points representing locations on a second region of the object, wherein the number of subsets of indistinguishable points is based on the number of variables associated with the pose for a set of robot commands;

determining, from said plurality of subsets of indistinguishable points, the pose of the object; and determining, based on the pose of the object, one or more robot commands from the set of robot commands.

2. The method of claim 1, further comprising the step of: determining the set of indistinguishable points from a plurality of markers.

3. The method of claim 2, wherein a marker comprises a visual feature of the object.

4. The method of claim 2, wherein a marker is attached to the object.

5. The method of claim 4, wherein the marker is a fixed distance from a location on the object.

6. The method of claim 2, wherein determining the set of indistinguishable points from a plurality of markers comprises detecting a location of a marker using a camera.

7. The method of claim 2, wherein determining the set of indistinguishable points from a plurality of markers comprises detecting a location of a marker using an optical sensor.

8. The method of claim 2, wherein determining the set of indistinguishable points from a plurality of markers comprises detecting a location of a marker using an inertial detector.

9. The method of claim 1, wherein the set of indistinguishable points includes at least three indistinguishable points.

10. The method of claim 1, wherein the set of indistinguishable points is separated into a plurality of subsets of indistinguishable points using a point cluster method.

11. The method of claim 1, wherein the set of indistinguishable points is separated into a plurality of subsets of indistinguishable points responsive to a distribution of the indistinguishable points.

12. The method of claim 1, wherein the object comprises a human body.

13. The method of claim 12, wherein the first region of the object comprises a first part of the human body and wherein the second region of the object comprises a second part of the human body.

14. The method of claim 1, wherein determining the pose of the object comprises:

determining an orientation of the first subset of indistinguishable points; and determining an orientation of the second subset of indistinguishable points.

15. The method of claim 14, wherein determining the orientation of the first subset of indistinguishable points comprises fitting an orientable geometry to the first subset of indistinguishable points.

16. The method of claim 14, wherein said determining one or more robot commands is responsive to the orientation of the first subset of indistinguishable points and to the orientation of the second subset of indistinguishable points.

17. The method of claim 14, wherein said determining one or more robot commands is responsive to an angle between the orientation of the first subset of indistinguishable points and the orientation of the second subset of indistinguishable points.

18. The method of claim 1, wherein the one or more robot commands are used to control a robot.

19. The method of claim 18, wherein the robot is a humanoid robot.

20. The method of claim 18, wherein the robot is a virtual robot.

21. A system for determining one or more robot commands, the system comprising:

a point separator, configured to receive a set of indistinguishable points, each indistinguishable point representing a location on an object, association of each indistinguishable point to the location on the object not predefined, said object having a pose and the point separator further configured to separate the set of indistinguishable points into a plurality of subsets of indistinguishable points including a first subset of indistinguishable points representing locations on a first region of the object and a second subset of indistinguishable points representing locations on a second region of the object, wherein the number of subsets of points is based on the number of variables associated with the pose for a set of robot commands;

a pose determiner, configured to determine the pose of the object from said plurality of subsets of indistinguishable points; and a robot command determiner, configured to determine one or more robot commands from the set of robot commands based on the determined pose of the object.

22. The system of claim 21, further comprising:

a marker detector, configured to detect locations of a plurality of markers and determine the set of indistinguishable points.

23. The system of claim 22, wherein the marker detector comprises a camera.

24. The system of claim 22, wherein the marker detector comprises an optical sensor.

25. The system of claim 22, wherein the marker detector comprises an inertial detector.

26. The system of claim 21, wherein the set of indistinguishable points includes at least three indistinguishable points.

27. The system of claim 21, further comprising:

a first orientation determiner, configured to determine an orientation of the first subset of indistinguishable points; and a second orientation determiner, configured to determine an orientation of the second subset of indistinguishable points.

28. The system of claim 27, wherein the first orientation determiner comprises a geometry fitter, configured to fit an orientable geometry to the first subset of indistinguishable points.

29. The system of claim 27, wherein the robot command determiner is further configured to determine one or more robot commands from the set of robot commands based on the orientation of the first subset of indistinguishable points and on the orientation of the second subset of indistinguishable points.

30. The system of claim 27, wherein the robot command determiner is further configured to determine one or more robot commands from the set of robot commands based on an angle between the orientation of the first subset of indistinguishable points and the orientation of the second subset of indistinguishable points.

31. A system for determining one or more robot commands responsive to a set of indistinguishable points, each indistinguishable point representing a location on an object, said object having a pose, the system comprising:

means for receiving the set of indistinguishable points, association of each indistinguishable point to the location on the object not predefined;

means for separating the set of indistinguishable points into a plurality of subsets of indistinguishable points including a first subset of indistinguishable points representing locations on a first region of the object and a second subset of indistinguishable points representing locations on a second region of the object, wherein the number of subsets of points is based on the number of variables associated with the pose for a set of robot commands;

means for determining, from said plurality of subsets of indistinguishable points, the pose of the object; and means for determining, based on the determined pose of the object, one or more robot commands from the set of robot commands.

32. The system of claim 31, further comprising:
means for determining the set of indistinguishable points from a plurality of markers.

33. The system of claim 32, wherein the means for determining the set of indistinguishable points from a plurality of markers comprises means for detecting a location of a marker using a camera.

34. The system of claim 32, wherein the means for determining the set of indistinguishable points from a plurality of markers comprises means for detecting a location of a marker using an optical sensor.

35. The system of claim 32, wherein the means for determining the set of indistinguishable points from a plurality of markers comprises means for detecting a location of a marker using an inertial detector.

36. The system of claim 31, wherein the means for determining the pose of the object comprises:
means for determining an orientation of the first subset of indistinguishable points; and
means for determining an orientation of the second subset of indistinguishable points.

37. The system of claim 36, wherein the means for determining the orientation of the first subset of indistinguishable points comprises means for fitting an orientable geometry to the first subset of indistinguishable points.

38. The system of claim 36, wherein the means for determining one or more robot commands is responsive to the orientation of the first subset of indistinguishable points and to the orientation of the second subset of indistinguishable points.

39. The system of claim 36, wherein the means for determining one or more robot commands is responsive to an angle between the orientation of the first subset of indistinguishable points and the orientation of the second subset of indistinguishable points.

* * * * *